United States Patent
Osamura et al.

(10) Patent No.: US 7,865,933 B2
(45) Date of Patent: Jan. 4, 2011

(54) AUTHENTICATION AGENT APPARATUS, AUTHENTICATION METHOD, AND PROGRAM PRODUCT THEREFOR

(75) Inventors: Toru Osamura, Kanagawa (JP); Hitoshi Tsushima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1120 days.

(21) Appl. No.: 11/385,676

(22) Filed: Mar. 22, 2006

(65) Prior Publication Data

US 2007/0124799 A1    May 31, 2007

(30) Foreign Application Priority Data

Nov. 30, 2005    (JP) .............................. 2005-345338

(51) Int. Cl.
*H04L 9/32*    (2006.01)
(52) U.S. Cl. .......................................................... 726/2

(58) Field of Classification Search .................. 726/2
See application file for complete search history.

(56) References Cited

U.S. PATENT DOCUMENTS

2004/0128532 A1*    7/2004    Ohishi et al. ................ 713/200
2007/0061866 A1*    3/2007    O'Toole ......................... 726/2

FOREIGN PATENT DOCUMENTS

JP    A-2004-129247    4/2004

* cited by examiner

*Primary Examiner*—Kambiz Zand
*Assistant Examiner*—Aubrey H Wyszynski
(74) *Attorney, Agent, or Firm*—Oliff & Berridge, PLC

(57) ABSTRACT

An authentication agent apparatus that authenticates a user who uses an image processing apparatus has an agent portion. The agent portion intermediates an authentication process between an image processing apparatus and a corresponding authentication portion among multiple authentication portions having different protocols, when a request for the authentication process is received.

16 Claims, 7 Drawing Sheets

FIG. 5

|  | full color | limited color | b&w |
|---|---|---|---|
| copy | yes | yes | yes |
| print | no | no | no |
| scan | no | NA | yes |
| fax/ifax | NA | NA | yes |

FIG. 6

|  | full color | limited color | b&w |
|---|---|---|---|
| copy | 10000 | 10000 | 50000 |
| print | 0 | 0 | 0 |
| scan | 0 | NA | 100000 |
| fax/ifax[1] | NA | NA | NA |

FIG. 7

|  | full color | limited color | b&w |
|---|---|---|---|
| copy | 10000 | 1000 | 40000 |
| print | 0 | 0 | 0 |
| scan | 0 | NA | 10000 |
| fax/ifax | NA | NA | NA |

AUTHENTICATION AGENT APPARATUS, AUTHENTICATION METHOD, AND PROGRAM PRODUCT THEREFOR

BACKGROUND

1. Technical Field

This invention relates to authentication agent and authentication method to authenticate the user who is going to use an image processing apparatus.

2. Related Art

With respect to authentication capabilities of authenticating the use of an information processing apparatus, there has been proposed a method of requesting an authentication service for an authentication process, the authentication service being connected to the image processing apparatus via a network. For example, the user name and the password are registered in the afore-described authentication service in advance. When the user logs in, the authentication service judges whether or not the user is allowed to use the apparatus. If the user is allowed, the operation panel becomes available to the user. If not, the user interface on the operation panel is grayed out to prohibit the use. An example of the techniques is described in Japanese Patent Application Publication No. 2004-129247. The management of the user information is externally unified so that multiple image processing apparatuses can commonly use the user names and passwords.

SUMMARY

An authentication agent apparatus that authenticates a user who uses an image processing apparatus has an agent portion. The agent portion intermediates an authentication process between an image processing apparatus and a corresponding authentication portion among multiple authentication portions having different protocols, when a request for the authentication process is received.

BRIEF DESCRIPTION OF THE DRAWINGS

Embodiments of the present invention will be described in detail based on the following figures, wherein:

FIG. 5 is a table showing permission/prohibition for services and functionalities according to the information of permission/prohibition for each service and functionality;

FIG. 6 is a table showing upper limits for services and functionalities according to the information on the user's usage for each service and functionality;

FIG. 7 is a table showing current numbers of the services and functionalities;

DESCRIPTION OF THE EMBODIMENTS

Figure 1:
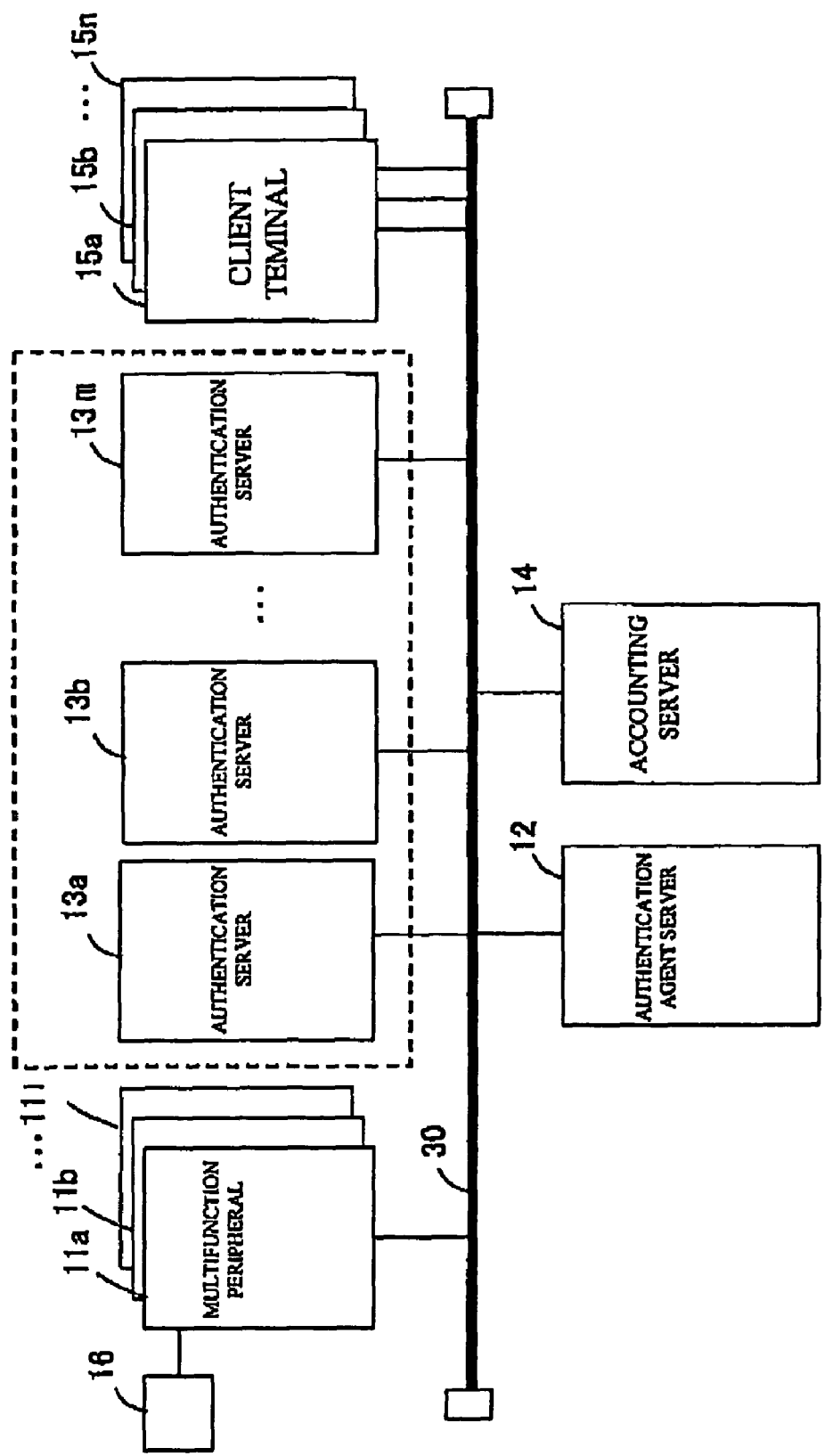
FIG. 1 is a system configuration of an authentication agent system in accordance with the present invention.

A description will now be given, with reference to the accompanying drawings, of embodiments of the present invention. FIG. 1 is a system configuration of an authentication agent system in accordance with the present invention. An authentication agent system 10 is provided for authenticating users that use an image processing apparatus. The authentication agent system 10 includes multifunction peripherals 11a through 11l that respectively serve as an image processing apparatus, an authentication agent server 12, multiple authentication servers 13a through 13m that respectively have different protocols, an accounting server 14, and client terminals 15a through 15n. These apparatuses, servers, and client terminals are connected through a network 30.

The multifunction peripherals 11a through 11l communicate with the authentication agent server 12 with a proprietary protocol. The authentication agent server 12 communicates with the authentication servers 13a through 13m with Kerberos. Kerberos is one of the authentication methods that employ encryption, and is utilized for authentication between the server and client on the network that the security cannot be guaranteed such as the Internet. Therefore, the multifunction peripherals 11a through 11l are capable of communicating with the authentication agent server 12. However, the multifunction peripherals 11a through 11l are not capable of communicating with the authentication servers 13a through 13m.

Figure 2:
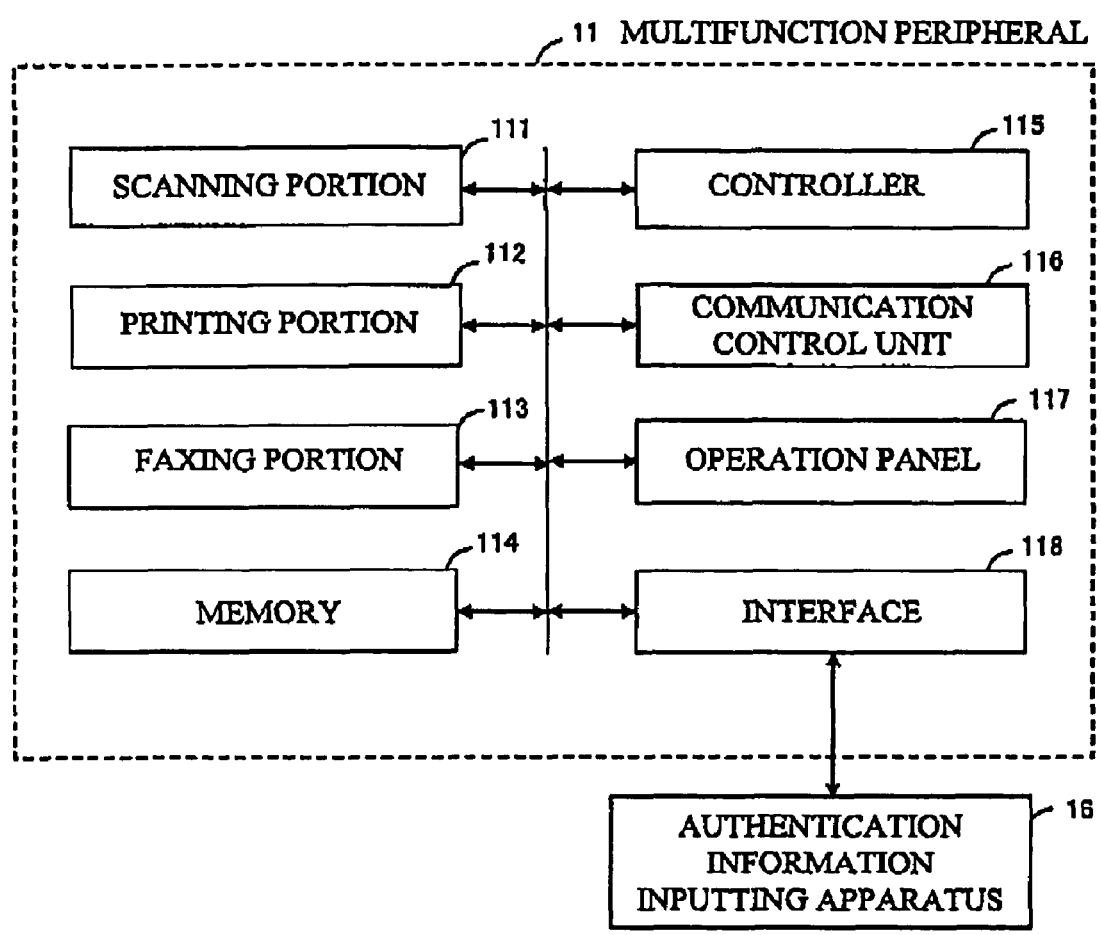
FIG. 2 shows a configuration of a multifunction peripheral.

The multifunction peripherals 11a through 11l respectively have scanning capabilities, printing capabilities, and copying capabilities. FIG. 2 shows a configuration of the multifunction peripheral 11. The multifunction peripheral 11 denotes any one of the multifunction peripherals 11a through 11l. The multifunction peripheral 11 includes a scanning portion 111, a printing portion 112, a faxing portion 113, a memory portion 114, a controller 115, a communication control unit 116, an operation panel 117, and an interface 118. An authentication information inputting apparatus 16 may respectively be connected to the multifunction peripherals 11a through 11l, so that the user can input authentication information. Alternatively, a virtual keyboard may be displayed on the operation panel 117 so as to serve as an input device.

The scanning portion 111 is provided for reading an image of a manuscript with an optical means. The printing portion 112 records an electrostatic latent image on a photoreceptor, develops the electrostatic latent image with the use of monochrome or color toner, and outputs to transfer such developed image on a recording paper. The faxing portion 113 sends and receives facsimile messages. The memory portion 114 stores image data scanned by the scanning portion 111, the image data being received through the network, the image being the received facsimile messages, and the like. The controller 115 controls the whole operations of the multifunction peripheral 11. The communication control unit 116 communicates with devices coupled with the network. The operation panel 117 displays an operation screen having icons, and inputs operation information according to the touch with the icons. The interface 118 enables to send and receive data with the authentication information inputting apparatus 16.

The authentication information inputting apparatus 16 is provided for inputting information necessary for user authentication such as user ID and password. The authentication information inputting apparatus 16 is composed, for example, of a reader for IC card or magnetic card, or keyboard. In a case where a reader of IC card or magnet card is employed as the authentication information inputting apparatus 16, the authentication information can be input by reading the authentication information of the user retained in the IC card or magnetic card. Alternatively, in a case where a keyboard is employed as the authentication information inputting apparatus 16, the user is able to input the user ID, password, and the like on the keyboard.

Figure 3:
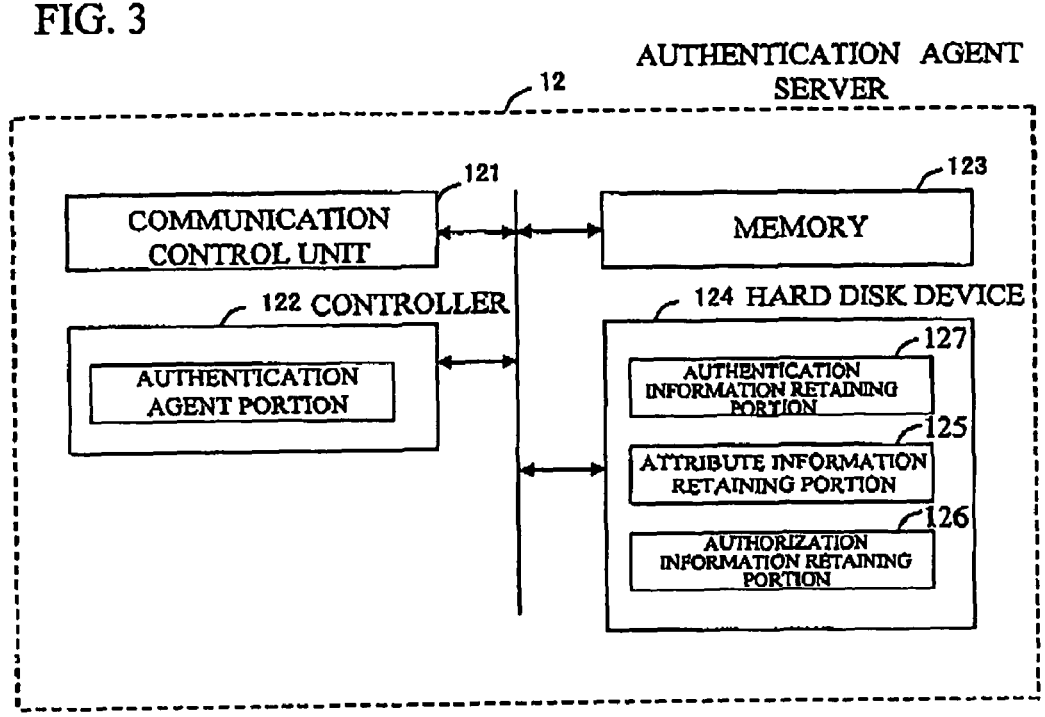
FIG. 3 shows a configuration of an authentication agent server.

The authentication agent server 12 intermediates between the multifunction peripheral 11*a* through 11*l* and the authentication servers 13*a* through 13*m*. FIG. 3 shows a configuration of the authentication agent server 12. The authentication agent server 12 includes a communication control unit 121, a controller 122, a memory 123, and a hard disk device 124. The communication control unit 121 communicates with devices coupled to the network 30. The controller 122 controls whole operations of the authentication agent server 12, and also serves as an authentication agent portion. More specifically, upon receiving a request for an authentication process of the use of the user who is going to use the multifunction peripheral 11 from the multifunction peripheral 11, the controller 122 implements a process that intermediates the authentication process between the multifunction peripheral 11 and the corresponding server among the authentication servers 13*a* through 13*m* having different protocols.

The hard disk device 124 serves as an attribute information retaining portion 125, a authorization information retaining portion 126, and an authentication information retaining portion 127. The attribute information retaining portion 125 retains attribute information of the users who use the multifunction peripheral 11 on a user basis. The authorization information retaining portion 126 retains authorization information of the users who use the multifunction peripheral 11 on a user basis. The authentication information retaining portion 127 retains authentication information necessary for the authentication process when receiving the authentication request from the multifunction peripheral 11, if there is no domain. The authorization information of the user includes an identifier of the image processing apparatus available to the user such as MFD1, MFD2, MFD3, and the like, information on permission to the user to use a functionality of the image processing apparatus, or information on the upper limit relating to the user's use of a functionality on the image processing apparatus. The information on the user's use of functionality on the image processing apparatus includes information of permission/prohibition for each service or functionality. With respect to the functionality, there are permissions and prohibitions in a matrix of the service and color information. The service includes copy, facsimile, and the like. The color information includes full color, limited number of colors, and monochrome.

FIG. 5 is a table showing permission/prohibition for services and functionalities according to the information of permission/prohibition for each service and functionality. This user is allowed to make a full color copy, the limited numbers of color copy, and monochrome copy, yet is not allowed to print. A code NA indicates that there is no corresponding functionality. A code ifax indicates an internet facsimile. FIG. 6 is a table showing upper limits of services and functionalities according to the information on the user's usage for each service and functionality. Each number shown in FIG. 6 indicates the number of faces (impressions) for printing.

Next, the authentication server is described. The authentication servers 13*a* through 13*m* respectively serve as a service for authentication, and respectively utilize a directory service such as Microsoft's Active Directory or an authentication service such as Kerberos or LDAP. Here, the directory service denotes a system for referring to information such as user information, and is used for data and resource management in the distributed environment. With the Active Directory, it is possible to uniformly manage and control user names, user settings, and printers and servers on the network. This makes it easy to construct a large-scale network system.

The authentication servers 13*a* through 13*m* respectively manage a domain dom1, a domain dom2, through a domain domn. The domain dom1 registers a user 11, a user 12, a user 13, through a user 1*n*. The domain dom2 registers a user 21, a user 22, a user 23, through a user 2*n*. The domain domn registers a user n1, a user n2, a user n3, through a user nn.

Figure 4:
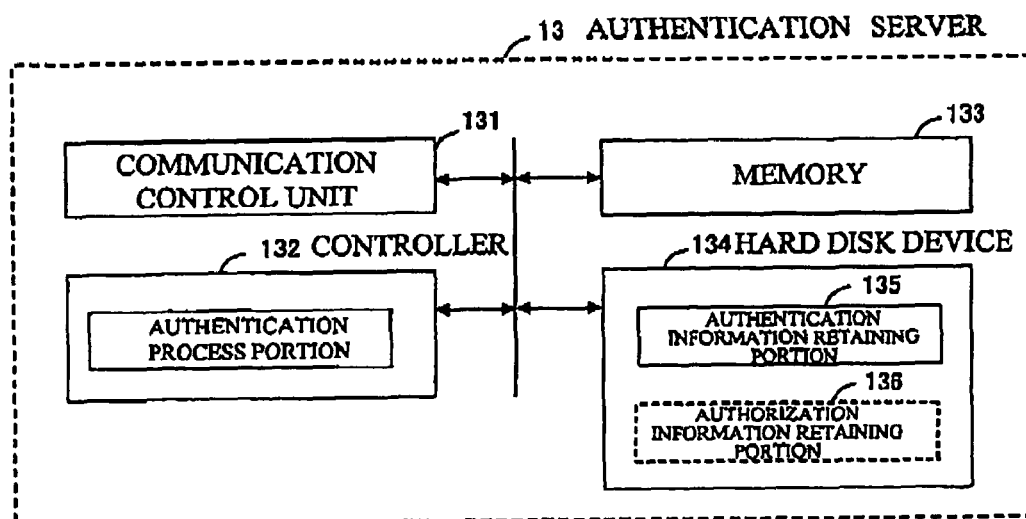
FIG. 4 shows a configuration of an authentication server.

FIG. 4 shows a configuration of the authentication server 13. The authentication server 13 includes a communication control unit 131, a controller 132, a memory 133, and a hard disk device 134. The communication control unit 131 communicates with devices coupled with the network. The controller 132 controls the whole operations of the authentication server 13, and particularly implements the authentication process of the user who is going to use the multifunction peripheral 11. The hard disk device 134 serves as an authentication information retaining portion 135 and a authorization information retaining portion 136. The authentication information retaining portion 135 retains the authentication information of users who use the multifunction peripheral 11 on a user basis, the authentication information being necessary for user authentication. The authorization information retaining portion 136 retains the authorization information of users who use the multifunction peripheral 11. Here, the authentication information includes information necessary for authenticating the user such as the user ID and password on a user basis. The authorization information retaining portion 136 does not have to be provided especially, if the authorization information retaining portion 126 is provided in the authentication agent server 12. In addition, the attribute information retaining portion 126 may be provided in the authentication server 13.

The accounting server 14 is now described. The accounting server 14 is provided for calculating and managing the status of use of the multifunction peripheral 11 on a user basis. The accounting server 14 calculates current numbers of faces (impressions) that have been printed, copied, and faxed by each user on the respective multifunction peripherals 11*a* through 11*l*. FIG. 7 is a table showing current numbers of the services and functionalities. The authentication agent server 12 acquires the current numbers of each user from the accounting server 14 to provide to the multifunction peripherals 11*a* through 11*l*. The client terminals 15*a* through 15*n* send a job of print to the multifunction peripherals 11*a* through 11*l*, and are used for remotely managing and controlling the authentication agent server 12, the authentication servers 13*a* through 13*m*, or the accounting server 14.

Figure 8:
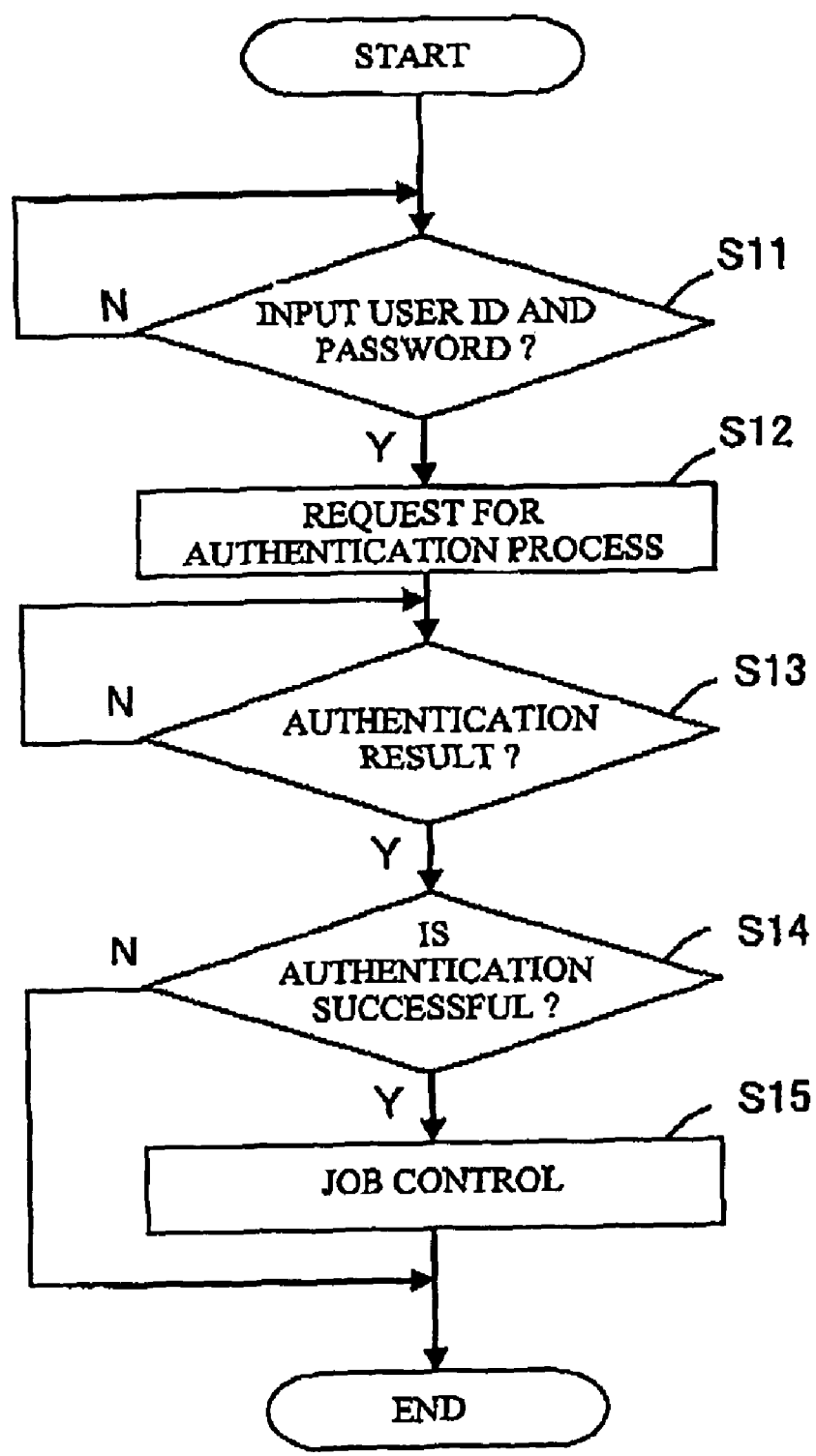
FIG. 8 is an operation flowchart of the multifunction peripheral 11.
Figure 9:
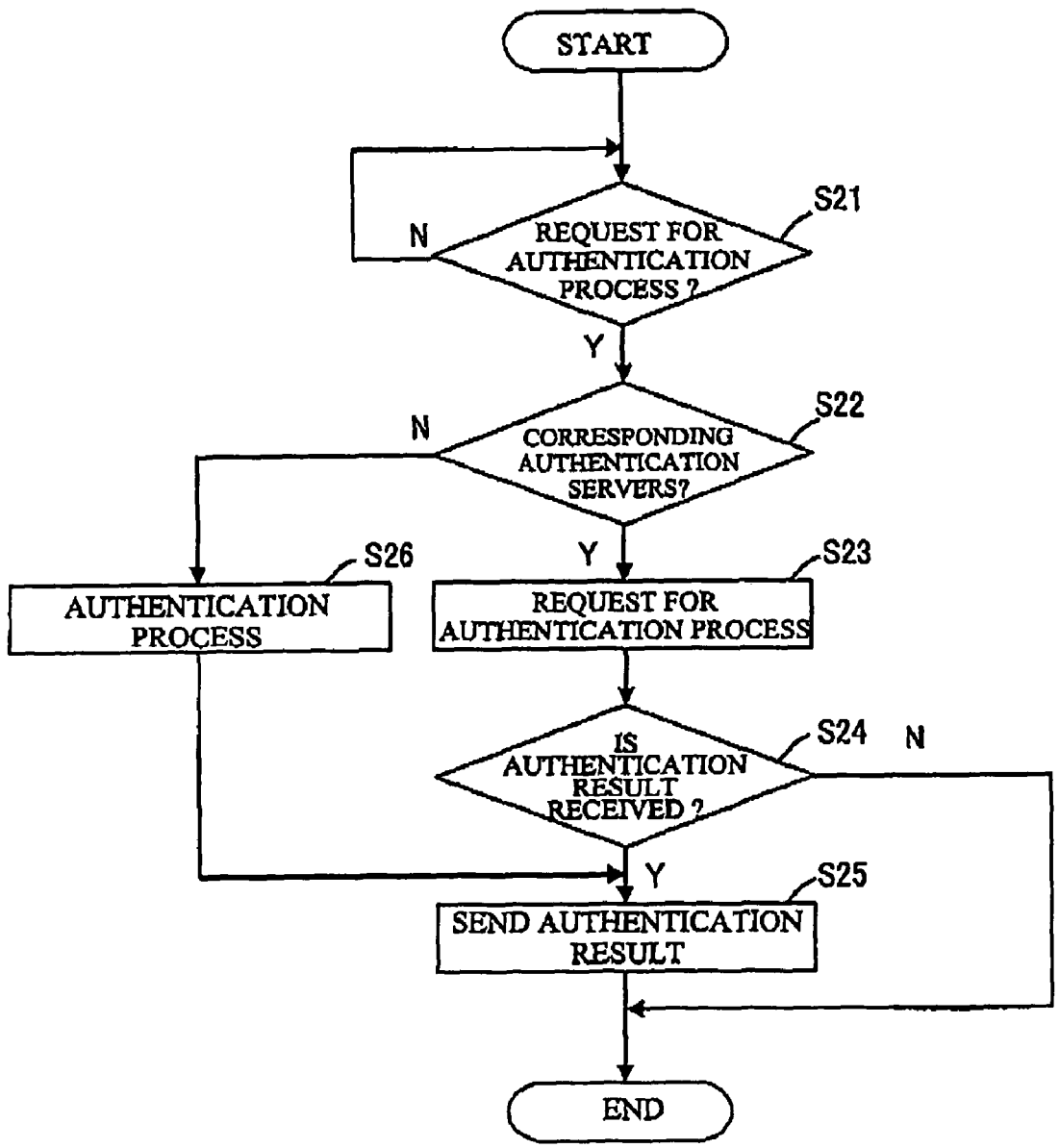
FIG. 9 is a flowchart of the authentication agent server 12.
Figure 10:
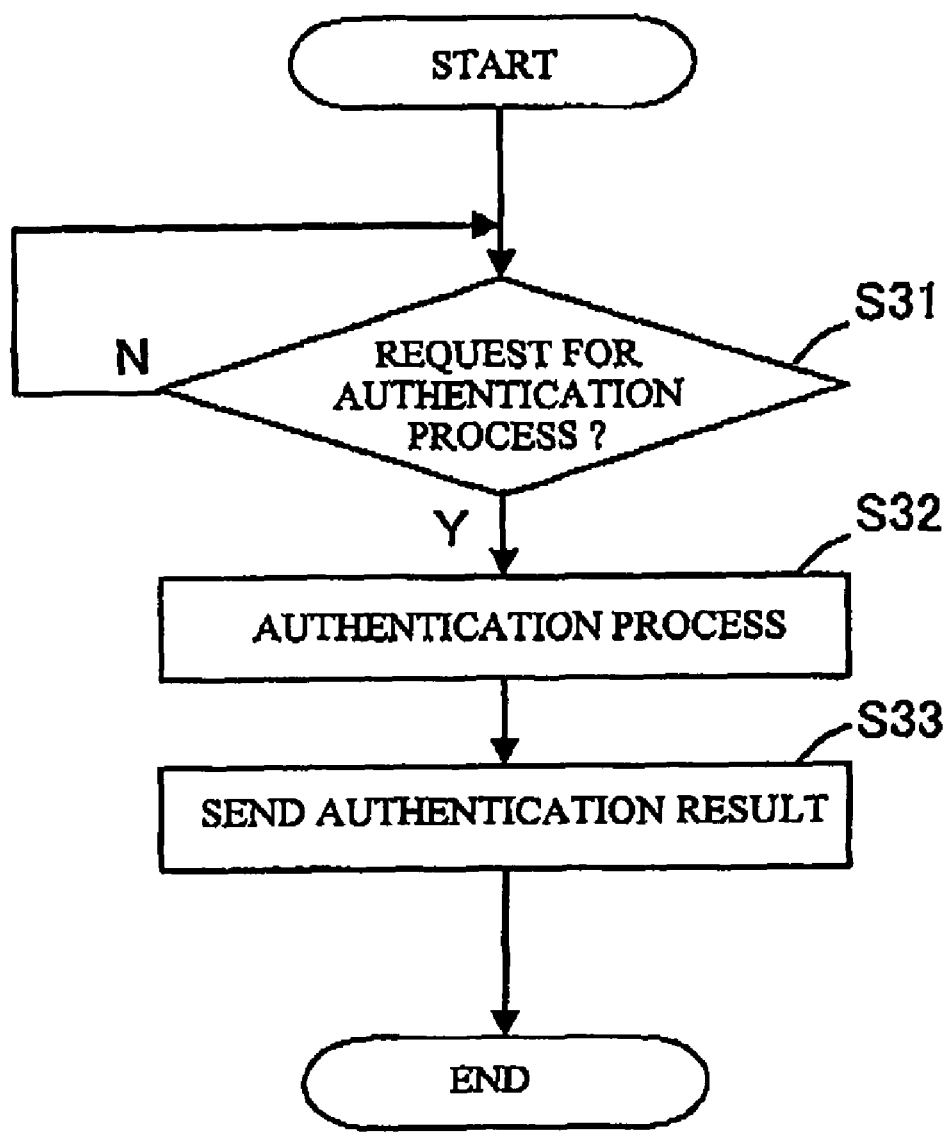
FIG. 10 is a flowchart of the authentication server 13.

Now, a description will be given of operations of the authentication agent system 10. FIG. 8 is an operation flowchart of the multifunction peripheral 11. FIG. 9 is a flowchart of the authentication agent server 12. FIG. 10 is a flowchart of the authentication server 13. The user pushes an authentication button on the operation panel of the multifunction peripheral 11 and inputs the user ID, for example, user D11, and password (at step S11). The controller 115 of the multifunction peripheral 11 issues a request of authentication process for the user who is going to use the multifunction peripheral 11, by notifying the user name, password, domain name to the authentication agent server 12 (at step S12). The domain name can be added by selecting from a list that has been acquired from the authentication agent server 12 in advance. For example, dom1 may be chosen from a domain list of [dom1, dom2] to give an instruction of authentication to the authentication agent server 12.

Upon receiving a request of the authentication process from the multifunction peripheral 11 (at step S21), the controller 122 of the authentication agent server 12 specifies an authentication protocol with the domain name according to the corresponding information of the domain name and the authentication protocol. If there is an authentication server 13 that can implement the authentication process (Y at step S22), the controller 122 issues a request to the corresponding authentication server 13 for the authentication process with the afore-mentioned user ID, namely, U11, password, and domain name (at step S23). With the domain name, the authentication server 13 that manages the domain name is specified. Upon receiving the request for the authentication process (at step S31), the controller 132 of the authentication server 13a implements the authentication process of the user U11 with the use of the user ID and password received from the authentication agent server 12 and the authentication information of the authentication information retaining portion 135 (at step S32). The controller 132 sends an authentication result back to the authentication agent server 12 after the authentication process (at step S33). Upon receiving the authentication result from the specified authentication server 13 (at step S24), the controller 122 of the authentication agent server 12 sends the authentication result to the multifunction peripheral 11 that issued the authentication process (at step S26). The controller 122 also sends the authentication result together with the status of use of the corresponding user from among the statuses of the users managed on the accounting server 14, if the authentication is successful on the specified authentication server 13.

If there is no authentication server that authenticates the user to be authenticated, when receiving a request for the authentication process from the multifunction peripheral 11 (N at step S22), the controller 122, instead of the authentication servers 13a through 13m, implements the authentication process of the use of the user who is going to use the multifunction peripheral 11 (at step S26). Then, the controller 122 notifies the authentication result to the multifunction peripheral 11 (at step S25). For example, if there is no domain name included in the information received from the multifunction peripheral 11, the controller 122 determines that the information intends to specify the user registered in the authentication agent server 12 and implements the authentication process with the use of the information of the authentication information retaining portion 127. If the authentication result is NG, the authentication agent server 12 returns the authentication result to the multifunction peripheral that issued the request.

The controller 122 sends the above-described authentication result together with the corresponding authorization information of the user retained in the authorization information retaining portion 126 to the multifunction peripheral 11, if the authentication process is successful on the authentication servers 13a through 13m. At this time, the controller 122 may send the authorization information of the user without determining the kind of functionality provided by the multifunction peripheral 11. In addition, the controller 122 sends the attribute information of the corresponding user retained on the attribute information retaining portion 125, if the authentication process is successful on the authentication servers 13a through 13m. If the attribute information of the user is an e-mail address, the multifunction peripheral 11 uses as a value of from of a scan service.

The controller 115 of the multifunction peripheral 11 receives the authentication result. If the authentication process is successful (at step S13 and S14), the controller 115 controls a job activation from the operation panel according to such acquired authentication result, the authorization information, or the attribute information (at step S15). The controller 115 prohibits the activation of all jobs for the user who is not authenticated, and also prohibits the prohibited service or the functionality according to such received authorization information, even if the user is authenticated. As shown in FIG. 5, with respect to the permission and prohibition of each service and functionality, this user is not allowed to do a full color print and full color scan. Accordingly, the services and functionalities relating thereto are prohibited. The menu of the panel is grayed out, or alternatively, the job is not activated even if the instruction is given. Further, with respect to the full color copy, this user has already reached to the upper limit. Therefore, the full color copy is also prohibited.

As described heretofore, there are unlimited possibilities in the type of the authentication apparatus that users desire. It is therefore impossible to realize the desire with an internally embedded type of multifunction peripheral. For example, it is much easier to realize the authentication agent portion on an external server having general versatility, as compared to the authentication portion included in the multifunction peripheral.

The authentication agent server 12 may set a parameter necessary for communication such as IP address of the authentication agent server 12 when the multifunction peripherals 11a through 11l are installed. This eliminates the necessity of providing a setting menu on the local user interface equipped in the multifunction peripherals 11a through 11l or on the remote user interface provided for setting the multifunction peripheral 11 on the browser screen.

The list of domains selected by the user is managed by the authentication agent server 12, because the list relates to the authentication servers 13a through 13m with which the authentication agent server 12 communicate. Therefore, the list of domains has to be sent to the multifunction peripherals 11a through 11l from the authentication agent server 12. For example, the authentication agent server 12 may send the list of domains to the multifunction peripherals 11a through 11l, when the multifunction peripherals 11a through 11l is powered on and the user of the multifunction peripherals 11a through 11l gives an instruction on the operation panel.

There is provided an authentication agent apparatus that authenticates a user who uses an image processing apparatus has an agent portion. The agent portion intermediates an authentication process between an image processing apparatus and a corresponding authentication portion among multiple authentication portions having different protocols, when a request for the authentication process is received.

In the authentication agent apparatus, the agent portion, upon receiving an authentication result from the authentication portion, may send the authentication result to the image processing apparatus that issued the request for the authentication process. In accordance with the present invention, it is possible to obtain the authentication result from multiple authentication portions having different protocols.

In the authentication agent apparatus, the agent portion may send authorization information of a corresponding user from the authorization information of users that use the image processing apparatus, if the authentication process implemented by the authentication portion is successful. In accordance with the present invention, it is possible to determine whether the user is allowed to use the image processing apparatus with the authorization information of the user that has been sent.

In the authentication agent apparatus, the agent portion may send the authorization information of the user to the image processing apparatus without determining a type of functionality that can be provided by the image processing apparatus. In accordance with the present invention, it is possible to provide the authorization information of the user, without understanding all functionalities of the image processing apparatus.

In the authentication agent apparatus, the agent portion may send attribute information of a corresponding user from the attribute information of users that use the image processing apparatus, if the authentication process implemented by the authentication portion is successful. In accordance with the present invention, it is possible to provide various services with the use of the user's attribute information. E-mail address is an example of the user's attribute information.

The authentication agent apparatus may further include a accounting portion that calculates and manages a status of the user's use of the image processing apparatus. The agent portion may send a corresponding status of the user's use from statuses of users managed by the accounting apparatus to the image processing apparatus, if the authentication process implemented by the authentication portion is successful. In accordance with the present invention, the image processing apparatus is capable of providing the service according to the user's status of use.

In the authentication agent apparatus, the agent portion, instead of said multiple authentication portions, may implement the authentication process of the use of the user who is going to use the image processing apparatus, if there is no corresponding authentication portion that authenticates the user to be authenticated when the request for the authentication process of the use of the user who is going to use the image processing apparatus is received from the image processing apparatus. In accordance with the present invention, it is possible to implement the authentication process on the user, even if the user is not registered in the authentication portion.

In accordance with the present invention, it is possible to provide the authentication agent apparatus and authentication method that can send and receive the request or result the authentication process between the image processing apparatus and multiple authentication services, even if there exist multiple authentication services.

Further, the functionalities of the authentication agent server 12 and those of the accounting server 14 may be realized in a single server, although this is different from FIG. 1. An authentication method in accordance with the present invention is realized by the authentication agent system 1. The authentication method in accordance with the present invention can be realized by a program to be executed by controlling a computer. This program is provided by storing in a magnetic disc, optical disc, semiconductor memory, and alternative storage device, or downloading the program through a communications line. Then, the steps of program are executed as the CPU operates the program.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-345338 filed on Nov. 30, 2005 including specification, claims, drawings, and abstract is incorporated herein by reference in its entirety.

What is claimed is:

1. An authentication agent apparatus that authenticates a user who uses an image processing apparatus, the authentication agent apparatus comprising:
   an agent server that intermediates an authentication process between the separate image processing apparatus and a separate authentication server that corresponds to the protocol of a requested authentication among multiple authentication servers having different protocols, when the request for the authentication process is received, the authentication agent intermediating the authentication process amongst multiple image processing apparatuses and multiple authentication servers.

2. The authentication agent apparatus according to claim 1, wherein the agent server, upon receiving an authentication result from the authentication server, sends the authentication result to an image processing apparatus that issued the request for the authentication process.

3. The authentication agent apparatus according to claim 1, wherein the agent server sends authorization information of a corresponding user from the authorization information of users that use the image processing apparatus, if the authentication process implemented by the authentication portion is successful.

4. The authentication agent apparatus according to claim 3, wherein the agent server sends the authorization information of the user to the image processing apparatus without determining a type of functionality that can be provided by the image processing apparatus.

5. The authentication agent apparatus according to claim 3, wherein the authorization information of the user includes at least one of an identifier of the image processing apparatus available to the user, information on permission to the user's use of the functionality on the image processing apparatus, and the information on an upper limit value of the user's use of the functionality on the image processing apparatus.

6. The authentication agent apparatus according to claim 1, wherein the agent server sends attribute information of a corresponding user from the attribute information of users that use the image processing apparatus, if the authentication process implemented by the authentication server is successful.

7. The authentication agent apparatus according to claim 1, further comprising an accounting portion that calculates and manages a status of the user's use of the image processing apparatus,
   wherein the agent server sends a corresponding status of the user's use from statuses of users managed by the accounting portion to the image processing apparatus, if the authentication process implemented by the authentication server is successful.

8. The authentication agent apparatus according to claim 1, wherein the agent server, instead of the multiple authentication servers, implements the authentication process of the use of the user who uses the image processing apparatus, if there is no corresponding authentication server that authenticates the user to be authenticated when the request for the authentication process of the use of the user who uses the image processing apparatus is received from the image processing apparatus.

9. An authentication method that authenticates a user who uses an image processing apparatus, the authentication method comprising:
   intermediating an authentication process between the separate image processing apparatus and a separate authentication server that corresponds to the protocol of a requested authentication among multiple authentication servers having different protocols, when the request for the authentication process is received, the authentication process being intermediated amongst multiple image processing apparatuses and multiple authentication servers.

10. The authentication method according to claim 9, further comprising:

sending an authentication result to the image processing apparatus that issued the request for the authentication process, when the authentication result is received from the authentication server.

11. The authentication method according to claim 9, further comprising:

sending authorization information of a corresponding user from the authorization information of users that use the image processing apparatus, if the authentication process implemented by the authentication server is successful.

12. The authentication method according to claim 9, further comprising:

sending attribute information of a corresponding user from the attribute information of users that use the image processing apparatus, if the authentication process implemented by the authentication server is successful.

13. The authentication method according to claim 9, further comprising:

implementing, instead of the multiple authentication servers, the authentication process of the use of the user who uses the image processing apparatus, if there is no corresponding authentication server that authenticates the user to be authenticated when the request for the authentication process for the use of the user who uses the image processing apparatus is received from the image processing apparatus.

14. A non-transitory storage medium readable by a computer, the non-transitory storage medium storing a program of instructions executable by the computer to perform a function for authenticating a user who uses an image processing apparatus, the function comprising:

intermediating an authentication process between the separate image processing apparatus and a separate authentication server that corresponds to the protocol of a requested authentication among multiple authentication servers, having different protocols, when the request for the authentication process is received, the authentication process being intermediated amongst multiple image processing apparatuses and multiple authentication servers.

15. The non-transitory storage medium according to claim 14, further comprising:

sending an authentication result to the image processing apparatus that issued the request for the authentication process, when the authentication result is received from the authentication server.

16. An image processing apparatus that requests authentication of a user to an authentication agent apparatus which specifies an authentication server corresponding to a request-authentication protocol among a plurality of authentication servers having different protocols, wherein the image processing apparatus receives an authentication result from the authentication agent apparatus and controls a job activation from an operation panel according to the authentication result.

* * * * *